United States Patent [19]

Ishimoto et al.

[11] Patent Number: 5,026,476

[45] Date of Patent: Jun. 25, 1991

[54] ANTIVIBRATION COVER FOR ROTARY MACHINE

[75] Inventors: Noriyuki Ishimoto, Aichi; Hirofumi Iida, Obu, both of Japan

[73] Assignee: Sumitomo Heavy Industries, Ltd., Tokyo, Japan

[21] Appl. No.: 534,606

[22] Filed: Jun. 6, 1990

[51] Int. Cl.⁵ .............................................. H12K 5/24
[52] U.S. Cl. ........................................ 210/89; 24/287; 181/202; 181/207; 310/51; 310/91
[58] Field of Search .................... 24/287; 29/451, 525, 29/596; 248/634, 635; 310/42, 51, 71, 89, 90, 91

[56] References Cited

U.S. PATENT DOCUMENTS

| | | | |
|---|---|---|---|
| 3,980,912 | 9/1976 | Panza .................................... | 181/202 |
| 4,103,192 | 7/1978 | Wendt et al. ......................... | 310/51 |
| 4,244,438 | 1/1981 | Willmann ............................. | 181/207 |
| 4,402,383 | 9/1983 | Bailey .................................. | 181/202 |
| 4,461,446 | 7/1984 | Hannibal et al. .................... | 248/634 |
| 4,811,820 | 3/1989 | Rossi .................................... | 310/92 |

FOREIGN PATENT DOCUMENTS

| | | |
|---|---|---|
| 848070 | 9/1952 | Fed. Rep. of Germany ........ 310/89 |
| 63-4156 | 1/1988 | Japan . |
| 1217992 | 1/1971 | United Kingdom . |
| WO87/06401 | 10/1987 | World Int. Prop. O. . |

*Primary Examiner*—Steven L. Stephan
*Assistant Examiner*—D. L. Rebsch
*Attorney, Agent, or Firm*—Armstrong, Nikaido, Marmelstein, Kubovcik, & Murray

[57] ABSTRACT

A rotary machine having a machine body and a cover covering an opening of the body. The cover is fixed to the body by an improved vibration-absorbent structure. A peripheral edge of the cover which is adjacent to the body has plate-spring-shaped mounting brackets whose distal ends project from the edge. The end of the machine body which is adjacent to the cover has mounting portions that are grooves or holes. The bracket distal ends are inserted into the mounting portions through rubber vibration insulating members. With the structure, the cover is assembled at improved efficiency and is restrained from vibration.

2 Claims, 3 Drawing Sheets

ANTIVIBRATION COVER FOR ROTARY MACHINE

BACKGROUND OF THE INVENTION

The present invention relates to a construction of a rotary machine such as a totally enclosed fan cooled rotary motor.

A conventional totally enclosed fan-cooled rotary motor has the following construction. As shown in FIG. 1, a stator comprising a stator core 2 and a stator coil 3 wound thereon is disposed within a stator frame 1 and is positioned between the inner periphery of the frame 1 and a rotor 5. The rotor 5 is disposed inward of the stator and is fixed to a rotary shaft 6. An end bracket 4 is fixed to one end of the stator frame 1. The rotary shaft 6 is rotatably supported by a bearing 7 which is in turn supported by the bracket 4. One end of the rotary shaft 6 extends through the end bracket 4, and a fan 8 is mounted to this shaft end. A fan cover 9 covering the fan 8 is fixed by bolts 11 to projection seats 10 provided on the end bracket 4.

The above-described construction entails the following problem. The fan cover 9 may resonate, generating large, unpleasant sound, when it is influenced by, e.g., incorrect balance of the rotor 5, electromagnetic vibration of the motor which includes high-frequency vibration when an inverter is driven, or gear meshing vibration of a geared motor.

In order to overcome the problem, the following proposals have hitherto been made:

(1) The adoption of a damping material as the material forming the fan cover;

(2) The adoption of a rubber vibration insulator, as shown in FIG. 2a or 2b. In the structure shown in FIG. 2a, a groove is formed on and around the side wall of a cylindrical rubber vibration insulator 12, while a hole is formed through the fan cover 9. The peripheral edge portion around the hole is fitted into the insulator groove. A bolt 11 is extended through a washer and the rubber vibration insulator 12, and is threaded into the projection seat 10, thereby fixing the fan cover 9 in place. In the structure shown in FIG. 2b, a rubber vibration insulator 12' is folded with a U-shaped section and has a protrusion which can be fit into a hole formed in the fan cover 9. A portion of the cover 9 is held between two layers of the rubber insulator 12'. A bolt 11 is threaded into the projection seat 10 in a similar manner, thereby fixing the fan cover 9 to the projection seats 10.

(3) The fan cover 9 is fixed to the projection seats 10 by means of plastic mounting pieces (see Japanese Patent Unexamined Publication No. 63-4156).

However, the above-described conventional vibration restraining means under Items (1) to (3) entail the following drawbacks:

The restraining means (1) is expensive because it employs as the damping material, a special material.

The restraining means (2) requires a long assembly time because the rubber vibration insulators must completely separate the fan cover from the projection seats. If the cover and the seats should brought into mutual contact through the bolts, the vibration restraining effect will be spoiled.

With the restraining means (3), the vibration insulating effect must be achieved at the sacrifice of strength.

SUMMARY OF THE INVENTION

An object of the present invention is to provide a low-cost, low-noise rotary machine of which the fan cover is restrained from vibration to reduce the level of noise produced by the rotary machine during operation, while enabling improved efficiency of cover assembly operation.

To this end, according to the present invention, there is provided a rotary machine comprising a machine body having an opening; a cover covering the opening of the body; and a means for fixing the cover to the machine body; the means comprising: a peripheral edge of the cover which is adjacent to the machine body; a plurality of plate spring-shaped mounting brackets provided on the peripheral edge, with their distal end portions projecting therefrom; a plurality of mounting portions provided on the machine body at the end adjacent to the cover, the mounting portions being a plurality of grooves or holes into which the distal end portions of the brackets are inserted; and rubber vibration insulating members through which the distal ends are inserted into the mounting portions.

With the above-specified construction of the rotary machine, since the cover is mounted by the structure where the mounting brackets are inserted into the mounting portions through the rubber vibration insulating members, the rubber vibration insulating members securely insulate the cover from vibration of the machine body, thereby suppressing the level of noise produced by the machine during operation. In addition, the position of the cover can be easily determined, thereby improving the efficiency at which the cover is assembled.

DESCRIPTION OF THE PREFERRED EMBODIMENT

An embodiment of the present invention will now be described with reference to the drawings.

Figure 1:
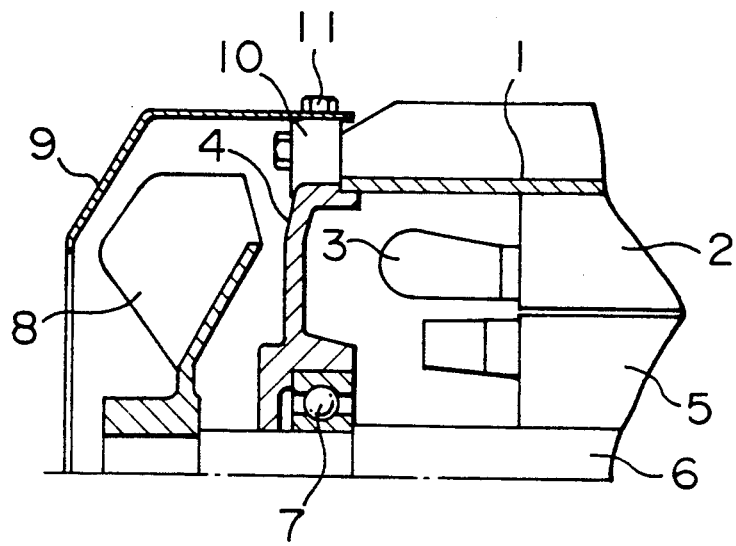
FIG. 1 is a fragmentary sectional view of a conventional totally enclosed fan-cooled rotary motor, showing essential parts thereof.
Figure 2A:
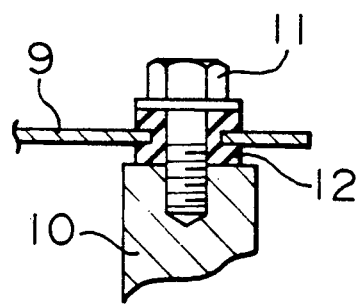
FIGS. 2a and 2b are sectional views showing conventional vibration restraining means.
Figure 2B:
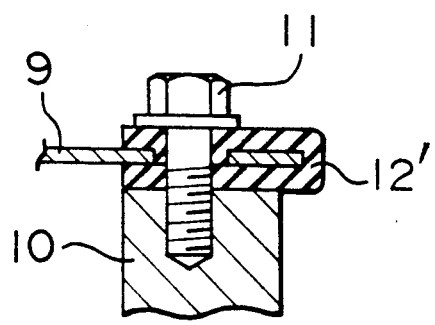
Figure 3:
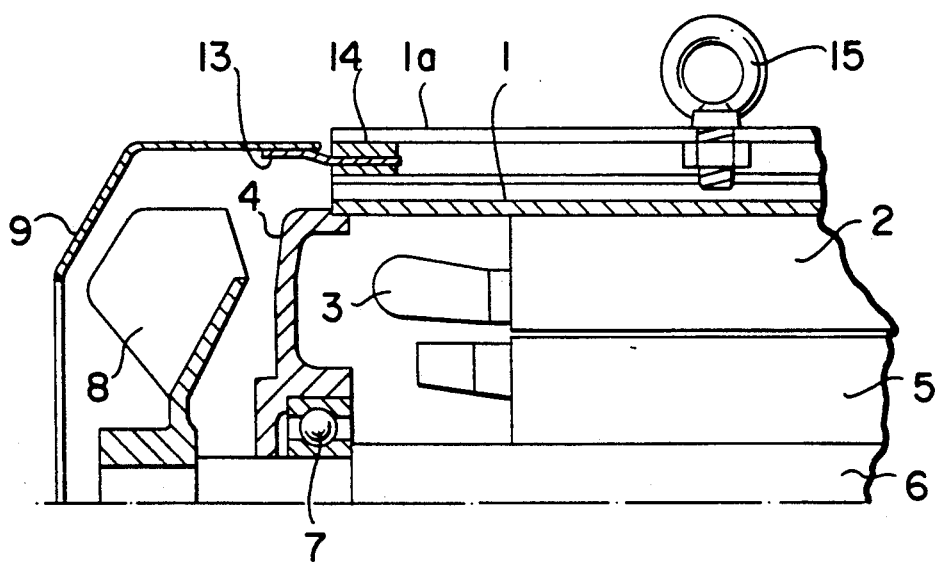
FIG. 3 is a fragmentary sectional view of a totally enclosed fan-cooled rotary motor according to one embodiment of the present invention.
Figure 4:
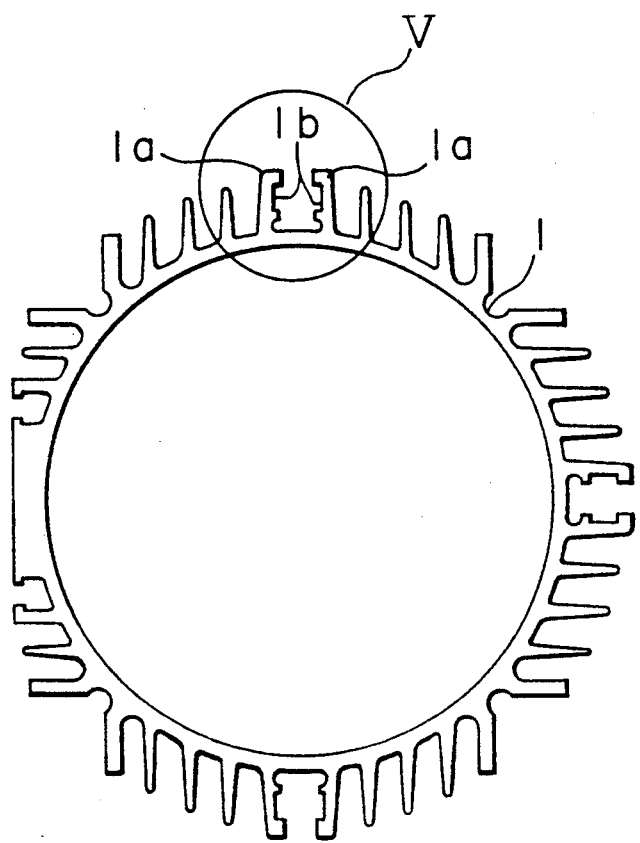
FIG. 4 is a sectional view of a stator frame of the motor shown in FIG. 3.
Figure 5:
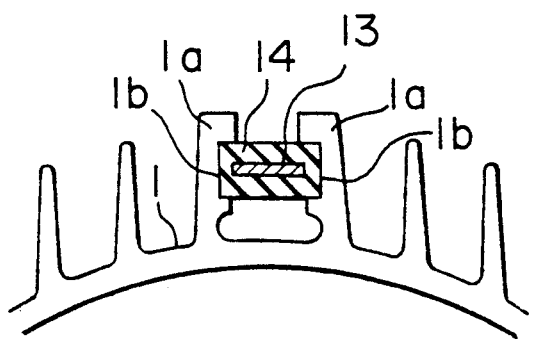
FIG. 5 an enlarged view of the part indicated by V in FIG. 4.

The basic construction of a totally enclosed fan-cooled rotary motor according to the embodiment is the same as that shown in FIG. 1, except for the means for fixing the fan cover to the stator frame. The cover mounting means employed in the embodiment will be described with reference to FIGS. 3 to 5.

A plurality of cooling fins are formed on the outer periphery of the stator frame 1, and they extend longitudinally of the frame 1. A plurality of fin pairs are each formed by two adjacent fins 1a which face each other. Longitudinal recesses 1b are formed on the mutually facing side surfaces of the fins 1a so that the recessed surfaces of the paired fins 1a define a plurality of paired longitudinal grooves. A lifting lug is engaged with a pair of grooves and is slid along the pair of grooves and fixed at a position that balances the motor. The manner in which the lifting lug is engaged with the lifting lug mounting grooves is shown in Japanese Utility Model Application No. 63-141954.

The fan cover 9 has a peripheral edge on the side of which the cover 9 is mounted to the machine body. A plurality of plate-spring-shaped brackets 13 are provided on the peripheral edge, with their distal end portions projecting therefrom. The lifting lug mounting grooves defined by the mutually facing surfaces of paired cooling fins 1a serve as cover mounting portions of the cover fixing means. A plurality of rubber vibration insulating members 14 have a dimension slightly larger than the size of the space between the mutually facing recesses 1b. Each rubber member 14 has a through hole extending longitudinally thereof. The rubber vibration insulating members 14 are already fitted into the interfin grooves.

During the mounting of the cover 9, the distal end portions of the plate-spring-shaped brackets 13 of the cover 9 are inserted through the through holes of the rubber members 14, whereby the fan cover 9 is mounted and fixed to the machine body.

The above-described cover fixing structure has the following advantages. The fan cover 9 can be easily mounted, thereby improving the efficiency of cover assembly operation. Since the rubber vibration insulating members 14 are interposed, the fan cover 9 is insulated from the stator frame 1, thereby suppressing vibration of the cover 9, hence, reducing the level of noise produced by the totally enclosed fan-cooled rotary motor during operation.

In addition, since the lifting lug mounting grooves are utilized to mount the fan cover 9, there is no need to provide any separate cover mounting portion. Thus, the mounting of the cover is achieved by a simple structure, while requiring only a small number of component parts.

In the above described embodiment, the cover fixing structure is such that the rubber vibration insulating members 14 are already fitted into the lifting lug mounting grooves, and, during cover assembly, the mounting brackets 13 are inserted through the rubber members 14 to fix the cover 9 in place. However, the structure may alternatively be such that the brackets 13 are already inserted into and fixed to the rubber members 14. In this case, the brackets 13 and the rubber members 14 can be simultaneously mounted or dismounted.

Although in the above-described embodiment the lifting lug mounting grooves are used as the portions for mounting the fan cover 9, this is a mere example. Alternatively, grooves for mounting a housing cover covering the entire machine may be used. Still alternatively, cover mounting portions such as grooves or holes may, of course, be provided separately.

Although the description given above concerns the mounting of a fan cover of a totally enclosed fan-cooled rotary motor, this is a mere example. The application of the present invention is not limited to the above-described mounting operation, and the present invention is applicable to the mounting of a cover of a rotary machine in general. For instance, the present invention may advantageously be applied as a method of mounting a fan cover of a reduction gear system, or a method of mounting an air deflector of an open, drip-proof rotary motor.

The present invention having the above-described construction provides the following advantageous effects.

A cover of a rotary machine is mounted to the machine body by a mounting means in such a manner that the cover is completely insulated from the machine body by a rubber vibration insulator. Therefore, vibration transmitted from various mechanism inside the rotary machine is absorbed by the rubber insulator so that substantially no vibration is transmitted to the cover of the rotary machine. As a result, the level of noise produced by the entire machine is lowered.

Further, since the mounting means has a simple structure, the machine can be manufactured at low cost. In addition, the position of the cover can be easily determined, thereby facilitating the cover assembly operation, hence, improving the efficiency of assembly operation.

What is claimed is:
1. A rotary machine comprising:
 a machine body rotatably mounting a shaft and having an opening at one end of said body;
 a fan secured to said shaft at said one end of said body;
 a cover covering said opening and said fan at said one end of said body; and
 means for fixing said cover to said machine body, said means comprising: a plurality of plate-spring-shaped mounting brackets provided on a peripheral edge of said cover adjacent said machine body with distal end portions of said brackets projecting from said cover; a plurality of mounting portions provided on said machine body at said one end adjacent to said cover, said mounting portions being a plurality of grooves or holes receiving said distal end portions of said brackets; and rubber vibration insulating members in said mounting portions between said distal end portions of said brackets and said mounting portions.
2. A rotary machine according to claim 1, wherein said mounting portions of said machine body comprise grooves adapted to engage with a lifting lug for holding said machine body in place.

* * * * *